(12) United States Patent
Ono

(10) Patent No.: US 7,483,988 B2
(45) Date of Patent: Jan. 27, 2009

(54) INFORMATION TRANSMISSION METHOD AND SYSTEM

(75) Inventor: Makoto Ono, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 629 days.

(21) Appl. No.: 09/802,252

(22) Filed: Mar. 8, 2001

(65) Prior Publication Data

US 2002/0016846 A1 Feb. 7, 2002

(30) Foreign Application Priority Data

Mar. 9, 2000 (JP) .............................. 2000-064447

(51) Int. Cl.
G06F 15/16 (2006.01)
G06F 9/445 (2006.01)
G06F 15/173 (2006.01)

(52) U.S. Cl. ....................................... 709/227; 717/178

(58) Field of Classification Search ................ 709/203, 709/217, 227; 713/171; 717/171–173, 176–178
See application file for complete search history.

(56) References Cited

U.S. PATENT DOCUMENTS

| | | | | | |
|---|---|---|---|---|---|
| 4,503,287 | A | * | 3/1985 | Morris et al. .................. | 380/45 |
| 4,685,055 | A | * | 8/1987 | Thomas ......................... | 705/56 |
| 4,959,861 | A | * | 9/1990 | Howlette ...................... | 726/33 |
| 5,014,234 | A | * | 5/1991 | Edwards, Jr. ................. | 726/33 |
| 5,023,907 | A | * | 6/1991 | Johnson et al. ............. | 710/200 |
| 5,103,476 | A | * | 4/1992 | Waite et al. .................... | 709/59 |
| 5,138,712 | A | * | 8/1992 | Corbin ......................... | 713/200 |
| 5,204,897 | A | * | 4/1993 | Wyman ....................... | 710/200 |
| 5,375,206 | A | * | 12/1994 | Hunter et al. ............... | 717/176 |
| 5,388,211 | A | * | 2/1995 | Hornbuckle ................ | 717/178 |
| 5,421,009 | A | * | 5/1995 | Platt ........................... | 709/221 |
| 5,495,411 | A | * | 2/1996 | Ananda ........................ | 705/32 |
| 5,497,479 | A | * | 3/1996 | Hornbuckle ................. | 463/29 |
| 5,708,709 | A | * | 1/1998 | Rose ............................ | 705/59 |
| 5,752,041 | A | * | 5/1998 | Fosdick ...................... | 717/178 |
| 5,771,354 | A | * | 6/1998 | Crawford .................... | 709/229 |

(Continued)

FOREIGN PATENT DOCUMENTS

JP    PUPA 05-228259    9/1993

(Continued)

OTHER PUBLICATIONS

Droms R. et al. "Request for Comments (RFC) 2131: Dynamic Host Configuration Protocol", Network Working Group, Mar. 1997, 45 pages.*

(Continued)

Primary Examiner—George C Neurauter, Jr.
(74) Attorney, Agent, or Firm—Ference & Associates LLC

(57) ABSTRACT

A user is permitted to execute a predetermined program only within a limited time that corresponds to a period wherein the user maintains a valid contract for a connection with a specific network provider. When a user activates or executes a program that is provided by a network provider, or an entity having a tie-up with the network provider, the user must refer to a licensing key that can halt at least a part of the functions of the program when a predetermined licensing (halting) condition is matched. The licensing key can be updated by making a connection with the network provider.

15 Claims, 8 Drawing Sheets

U.S. PATENT DOCUMENTS

| | | | | |
|---|---|---|---|---|
| 5,790,664 A | * | 8/1998 | Coley et al. | 709/203 |
| 5,826,000 A | * | 10/1998 | Hamilton | 714/4 |
| 5,852,722 A | * | 12/1998 | Hamilton | 709/221 |
| 5,859,969 A | * | 1/1999 | Oki et al. | 709/200 |
| 5,901,228 A | * | 5/1999 | Crawford | 705/34 |
| 5,925,127 A | * | 7/1999 | Ahmad | 713/200 |
| 6,009,401 A | * | 12/1999 | Horstmann | 705/1 |
| 6,012,088 A | * | 1/2000 | Li et al. | 709/219 |
| 6,014,651 A | * | 1/2000 | Crawford | 705/400 |
| 6,023,766 A | * | 2/2000 | Yamamura | 726/29 |
| 6,101,606 A | * | 8/2000 | Diersch et al. | 726/27 |
| 6,260,141 B1 | * | 7/2001 | Park | 713/155 |
| 6,460,140 B1 | * | 10/2002 | Schoch et al. | 713/200 |
| 6,578,199 B1 | * | 6/2003 | Tsou et al. | 717/178 |
| 6,832,230 B1 | * | 12/2004 | Zilliacus et al. | 707/203 |

FOREIGN PATENT DOCUMENTS

| | | |
|---|---|---|
| JP | PUPA 05-288077 | 11/1993 |
| JP | PUPA 08-76994 | 3/1996 |
| JP | PUPA 09-297682 | 11/1997 |
| JP | PUPA 09-305408 | 11/1997 |
| JP | PUPA 09-319571 | 12/1997 |
| JP | PUPA 10-275132 | 10/1998 |
| JP | PUPA 11-296437 | 10/1999 |
| JP | PUPA 2000-35885 | 2/2000 |
| WO | WO 9915947 A1 * | 4/1999 |

OTHER PUBLICATIONS

Cornell University. "Dial-up Networking on Windows 95 Computers at NYSAES", published Aug. 19, 1998, <http://www.nysaes.cornell.edu/cc/notes/366.pdf>, 4 pages.*
Grosse, Paul. "enCommerce Inc. : getAccess", Jan. 1999, 5 pages.*
Internet Connect Manual for Not Connected People, Internet Magazine No. 54, Impress. Jul. 1, 1999 (vol. 54, pp. 482-497) (Japanese) Mada tsuraide inai hito no tame no Internet Setsuzoku Manual.

* cited by examiner

| User ID 201 | Password 203 | Valid flag 205 | P-key 1 207 | P-key 2 209 | ... |
|---|---|---|---|---|---|
| ⋮ | ⋮ | ⋮ | ⋮ | ⋮ | ⋮ |

200

INFORMATION TRANSMISSION METHOD AND SYSTEM

CLAIM FOR PRIORITY

This application claims priority from Japanese Application No. 2000-64447, filed on Mar. 9, 2000, and which is hereby incorporated by reference as if fully set forth herein.

FIELD OF THE INVENTION

The present invention generally relates to the transmission of software via the Internet, and in particular, to controlling the period of validity for distributed software.

BACKGROUND OF THE INVENTION

For Internet providers, a so-called "enclosure of users, or user engagement" a process employed for increasing the number of users and for retaining those users that have been acquired, is an extremely important item. Therefore, currently, various strategies for effecting enclosure are being developed, including some (e.g., the OCN Aptiva Pack by NTT communications) whereby a user, contingent upon the execution of a bilateral contract for a connection with an Internet service provider, is supplied a personal computer at no (additional) cost.

For such an offer, the terms of which are effective for a specified period of time, so long as a monthly connection fee is paid, an essentially free PC is provided for the employment of the user. In this case, a major contributing factor to the success of the Internet service provider in effecting an enclosure of the user is that the provider can repossess the PC if the user cancels the contract.

However, this strategy is not viable when applied to a user who already owns a PC. When such a user enters into a contract with a provider, although it may appear possible for the provider to take advantage of a method whereby, in addition to the free distribution of PCs, free software is provided, in such a case, even though, as is described above, when free hardware is provided it can be repossessed if a user cancels a contract and therefore free provision means is established as an effective enclosure means (which contributes to the retention of a user once the user has subscribed to an Internet service provider), for software, no effective means exists by which to cancel a license for the use of software that has been downloaded to a user's PC. Thus, it is difficult for a provider to use the provision of free software as an enclosure means.

SUMMARY OF THE INVENTION

The present invention broadly contemplates a system and method for information transmission, and in particular, controlling the period of validity for software distributed through a licensing key that provides a license valid for only a short period of time. Since the a software license is preferably updated only when a connection with a provider has been effected, this ensures that enclosure can be successfully employed by the provider.

In accordance with one aspect of the invention, when a user activates or executes a program that is furnished by a network provider, or by an entity that has a tie-up with the network provider, and the program matches a predetermined licensing (halting) condition, the user refers to a licensing key that can disable at least a part of the function performed by the program. This licensing key can be updated by effecting a connection with the network provider, so that the user, by maintaining a connection contract with the network provider, can execute the predetermined program.

According to another aspect of the present invention, an information distribution method for transmitting information to an information terminal connected via a network, is provided, which comprises the steps of: a user, who uses a network via a network provider under a condition of payment of a connection fee, transmitting a connection request that includes a user ID from an information terminal of the user to the network provider; downloading a program from a server managed by the network provider, or by an entity that has a tie-up with the network provider; transmitting, to the information terminal of the user, either a license key that is referred to when the downloaded program is activated or executed and that disables at least a part of the function of the program when the program matches a predetermined license condition, or information with which the license key can be generated; again transmitting, following the step, a connection request that includes the user ID from the information terminal of the user to the network provider; and transmitting, to the information terminal of the user, either a new license key that is referred to when the downloaded program is activated or executed and that disables at least a part of the function of the program when the program matches another predetermined license condition, or information with which the new license key can be generated.

According to an additional aspect of the present invention, an information distribution method for transmitting information to an information terminal connected via a network is provided, which comprises the steps of: a user, who obtains a user ID and a password and employs a network via a network provider under a condition of payment of a connection fee, activating a dialer at the information terminal, entering the user ID, the password and a telephone number for accessing the network provider, and transmitting a connection request to the network provider; checking, upon the receipt of the connection request for the network provider, the user ID and the password that are included in the connection request; transmitting, when the results obtained by the check are negative, a message used to notify the user of a connection failure; assigning, when the results obtained by the check are affirmative, an IP address to the information terminal of the user, and registering a set consisting of the user ID and the correlated IP address; transmitting the IP address assigned for the information terminal of the user; transmitting a service menu screen, which is an initial screen, from the network provider to the information terminal of the user; transmitting, when the user selects a file for downloading an article on the service menu, a request for a connection with a file server from the information terminal of the user to the network provider; transmitting, when the file server receives the connection request, to the information terminal of the user a file downloading service menu or a menu that can be introduced into the file downloading service menu; transmitting, when the user selects the downloading of a desired file from the file downloading service menu, a file downloading request from the information terminal of the user to the network provider; generating a license key, based on specified downloaded program information, that is associated with the desired file that is selected by the user and with the user ID that is specified for the IP address included in the file downloading request and assigned to the information terminal of the user, and information that is associated with a license condition for a downloaded program; referring to the license key when the downloaded program is activated or executed, and transmitting to the user, when the program matches the license condition, not only the license key but also a program for disabling at least a part of the function of the downloaded program; disconnecting the information terminal of the user from the network provider; activating a dialer, following the termination of the preceding step, in the information terminal of the user, entering the user ID, the password and the telephone number for accessing the network provider, and thereafter transmitting a connection request to the network provider; checking again, when the network provider receives the connection request, the user ID and the password that are included in the connection request; assigning an IP address, when the results obtained by the re-checking are affirmative, for the information terminal of the user and registering a set consisting of the user ID and the corresponding IP address; transmitting the downloaded program specifying information from the information terminal of the user to the network provider; generating a new license key based on the user ID and the received downloaded program specifying information; and transmitting the new license key to the information terminal of the user.

According to a further aspect of the present invention, an information distribution method for transmitting information to an information terminal connected via a network is provided, which comprises the steps of: a user, who obtains a user ID and a password and employs a network via a network provider under a condition of payment of a connection fee, activating a dialer at the information terminal, entering the user ID, the password and a telephone number for accessing the network provider, and transmitting a connection request to the network provider; checking, upon the receipt of the connection request for the network provider, the user ID and the password that are included in the connection request; transmitting, when the results obtained by the check are negative, a message used to notify the user of a connection failure; assigning, when the results obtained by the check are affirmative, an IP address to the information terminal of the user, and registering a set consisting of the user ID and the correlated IP address; transmitting the IP address assigned for the information terminal of the user; transmitting a service menu screen, which is an initial screen, from the network provider to the information terminal of the user; transmitting, when the user selects a file for downloading an article on the service menu, a request for a connection with a file server from the information terminal of the user to the network provider; transmitting, when the file server receives the connection request, to the information terminal of the user a file downloading service menu or a menu that can be introduced into the file downloading service menu; transmitting, when the user selects the downloading of a desired file from the file downloading service menu, a file downloading request from the information terminal of the user to the network provider; generating a license key, based on specified downloaded program information, that is associated with the desired file that is selected by the user and with the user ID that is specified for the IP address included in the file downloading request and assigned to the information terminal of the user, and information that is associated with a license condition for a downloaded program; registering the user ID and the downloaded program specifying information with which the user ID is correlated; referring to the license key when the downloaded program is activated or executed, and transmitting to the user, when the program matches the license condition, not only the license key but also a program for disabling at least a part of the function of the downloaded program; disconnecting the information terminal of the user from the network provider; activating a dialer, following the termination of the preceding step, in the information terminal of the user, entering the user ID, the password and the telephone number for accessing the network provider, and thereafter transmitting a connection request to the network provider; checking again, when the network provider receives the connection request, the user ID and the password that are included in the connection request; assigning an IP address, when the results obtained by the re-checking are affirmative, for the information terminal of the user and registering a set consisting of the user ID and the corresponding IP address; searching for the downloaded program specifying information that is registered while correlated with the user ID; generating a new license key based on the user ID and the downloaded program specifying information that is found through the search; and transmitting the new license key to the information terminal of the user.

According to a still further aspect of the present invention, an information distribution method for transmitting information to an information terminal connected via a network is provided and comprises the steps of: transmitting a connection request, which includes a user ID, to a network provider from an information terminal of a user that holds either a license key, which is referred to when a program is activated or executed and which disables at least a part of the function of the program when the program matches a predetermined license condition, or information with which the license key can be generated; and transmitting, from the network provider to the information terminal of the user, a new license key for the program or for information that can generate the new license key.

According to one more aspect of the present invention, an information distribution system for, under the conditions imposed for the payment of a connection fee, transmitting information to an information terminal of a user who uses a network via a network provider is provided and comprises: a PPP server for receiving, from the information terminal, a connection request, including a user ID, and for supporting a network connection; a file server for receiving, from the information terminal, a request for the transmission of a downloaded program, and for transmitting to a network provider a connection request, which includes a user ID, from an information terminal of a user that holds either a license key, which is referred to when a program is activated or executed and which disables at least a part of the function of the program when the program matches a predetermined license condition, or information with which the license key can generated; and a subscription manager for, when the user is again connected to the PPP server, generating a new license key for the downloaded program.

According to yet one more aspect of the present invention, a software product for transmitting information to an information terminal connected via a network is provided, comprising: program code for, when a connection request, including a user ID, is transmitted to a network provider from an information terminal of a user who employs, via the network provider, a network under a condition that is dependent on the payment of a connection fee, and when the information terminal is connected to the network provider and a program is downloaded from the network provider, or from a server operated by an entity having a tie-up with the network provider, generating a license key, which is referred to when the downloaded program is activated or executed and which disables at least a part of the function of the downloaded program when the downloaded program matches a predetermined license condition, or information with which the license key can be generated; and program code for generating a new license key for the downloaded program when the user is again connected to the network provider.

According to yet another aspect of the present invention, a program storage device readable by machine, tangibly embodying a program of instructions executable by the machine to perform a method for transmitting information to an information terminal connected via a network is provided, comprising the steps of: transmitting a connection request, which includes a user ID, to a network provider from an information terminal of a user that holds either a license key, which is referred to when a program is activated or executed and which disables at least a part of the function of said program when said program matches a predetermined license condition, or information with which said license key can be generated; and transmitting, from said network provider to said information terminal of said user, a new license key for said program or for information that can generate said new license key.

Within the scope of the claims for this specification, the term "software product" is a concept that includes a program, a recording medium used for storing the program, and another accompanying object sold at the same time as the software.

For a better understanding of the present invention, together with other and further features and advantages thereof, reference is made to the following description, taken in conjunction with the accompanying drawings, and the scope of the invention that will be pointed out in the appended claims.

DETAILED DESCRIPTION OF THE PREFERRED EMBODIMENT

Figure 1:
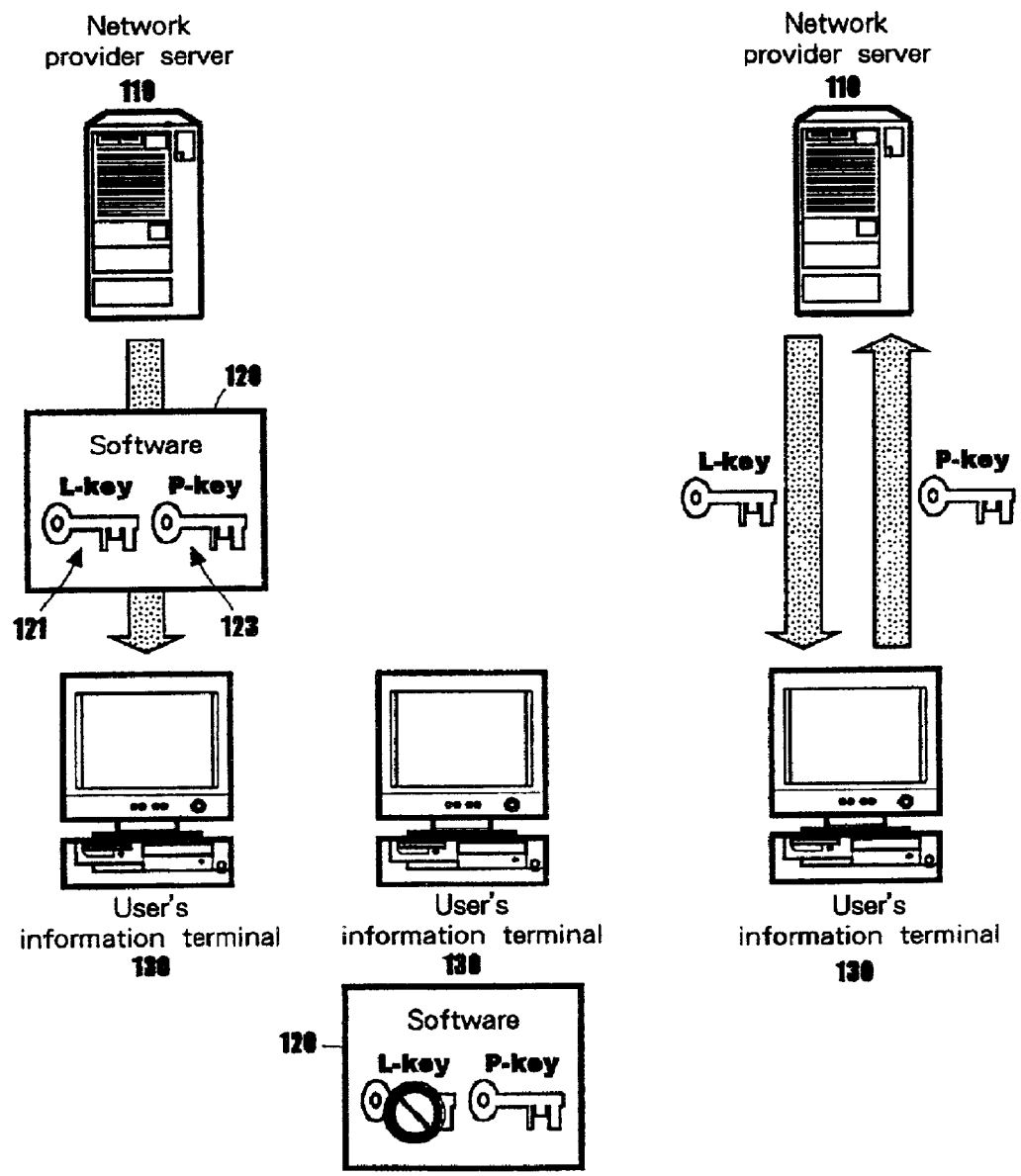
FIG. 1 is a conceptual diagram showing a mode for the downloading of software and the updating of a license key in accordance with a first embodiment of the present invention.

FIG. 1 is a conceptual diagram showing a mode for the downloading of software and for the updating of a licensing key in accordance with the preferred embodiments of the present invention. In this example, first, a user obtains a user ID and a password by making a contract, with a network provider 110, that enables the user, by the payment of a connection fee, to use a network via the network provider 110.

The user can access the network provider 110, or a predetermined file server belonging to a software provider that has a tie-up with the network provider 110, and can download and use desired software 120. An L-Key (license key) 121, which is referred to when the software 120 is activated or when a specific function of the software 120 is used following activation, and a P-Key 123, which specifies the software, are embedded in the software 120. The L-Key 121 includes information concerning usage conditions corresponding to the number of times the software can be used, and to the authorized usage period and expiration date. When the software 120 does not match the usage conditions, the use of all or a part of the functions available with the software 120 is inhibited.

The L-Key 121 is updated when the user is connected to the network provider 110. Thus, when the user seeks to access the network using the user ID and the password, the network provider 110 identifies the user, and permits the network connection if the user is registered. Then, after the network connection has been permitted, the dialer of the information terminal of the user transmits the P-Key 123 to the network provider 110, and upon the receipt of the P-Key 123 the network provider 110 employs the user ID and the P-Key 123 to generate a new L-Key 121 that it transmits to the user. Thereafter, at the user, after the old L-Key 121 has been updated to the new L-Key 121 the software 120 can be employed.

In this example, information as to which software the user has downloaded is registered and managed, but to carry out the provisions of the present invention, this information may in addition be managed by the network provider 110. Further, in this example, to verify the identity of a user ID and a password must be entered by the dialer. However, the telephone number of a caller may also be defined as the user ID, as in the i mode used for NTT Docomo Co., Ltd, and may be automatically included in a message transmitted as a connection request. In this mode, the entry of a password is not a requisite condition for the carrying out of the provisions of the present invention.

Figure 2:
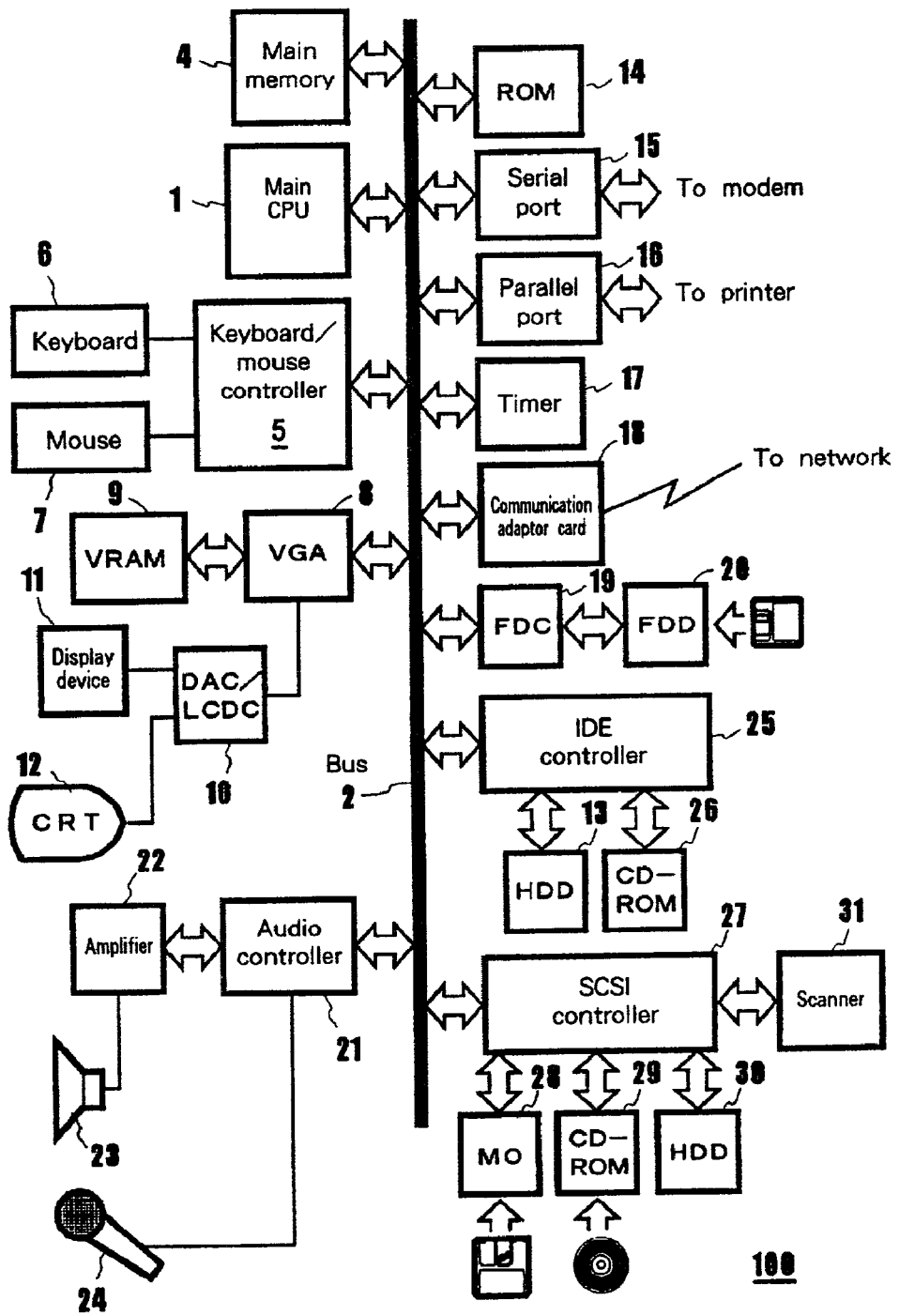
FIG. 2 is a schematic diagram illustrating a hardware configuration for the performance of the processing of this invention.

FIG. 2 is a schematic diagram illustrating a hardware configuration for the performance of the functions of a PPP server 111, a file server 170, or a user's information terminal 130 for the present invention, which will be described later. The PPP server 111, the file server 170 or the user's information terminal 130 comprises a central processing unit (CPU) 1 and a main memory 4. The CPU 1 and the main memory 4 communicate, via a bus 2 and an IDE controller 25, with an auxiliary storage device, a hard disk drive (HDD) 13 or 30. A floppy disk drive (FDD) 20 (or an MO or a CD-ROM drive 26, 28 or 29) is connected to the bus 2 via a floppy disk controller (FDC) 19 (or the IDE controller 25 or a SCSI controller 27).

Stored on a floppy disk (or an MO or a CD-ROM) that is inserted into the floppy disk drive 20 (or into the MO or the CD-ROM drive 26, 28 or 29), the hard disk drive 13 and a ROM 14 is code for a computer program that is used, in coordination with an operating system, to issue instructions to the CPU 1 and to implement the provisions of the present invention. This program code, which is loaded into the main memory 4 for execution, can be compressed, or it can be divided into a plurality of code segments and recorded using a plurality of media.

The PPP server 111, the file server 170 or the user's information terminal 130 further includes user interface hardware, the components of which include, for example, a pointing device (a mouse, a joy stick, a track ball, etc.) 7, for entering screen position information, a keyboard 6, for supporting key input, and a display 11 or 12, for providing image data for a user. A loudspeaker 23 receives tone signals, via an amplifier 22, from an audio controller 21 and releases them as sound or speech. The PPP server 111, the file server 170 or the user's information terminal 130 can communicate with another computer via a serial port 15 and a modem, or via a communication adaptor 18 (an ethernet or a token ring card).

It would therefore be easily understood that the user's information terminal 130 of the present invention can be provided by employing an ordinary personal computer (a PC); a work station; a portable information terminal, such as a portable telephone; a printer; a game machine; a computer that can be incorporated into various types of electric home appliances, such as televisions or facsimile machines; or a combination of these apparatuses. The above described components, however, are merely examples, and not all of them are required for the present invention. In particular, since the user's information terminal 130 of the present invention need only include a file downloading function, for this embodiment components such as the audio controller 21, the amplifier 22, the loudspeaker 23 and a scanner 31 are not requisite.

Further, since the PPP server 111 and the file server 170 require only a network connection function and a file downloading support function, and since these functions can be provided by employing an ordinary personal computer (a PC); a work station; a communication device, such as a router; a computer incorporated into one of various types of electric home appliances; or a combination of these apparatuses, for the embodiment, components such as the audio controller 21, the amplifier 22, the loudspeaker 23 and the scanner 31 are not requisite.

The operating system for the PPP server 111, the file server 170, or the user's information terminal 130 is one that supports, as a standard, a GUI multiwindow environment, such as WindowsNT (a trademark of Microsoft), Windows9x (a trademark Microsoft), Windows 3.x (a trademark of Microsoft), OS/2 (a trademark of IBM), MacOs (a trademark of Apple), Linux (a trademark of Linus Torvalds) or the X-WINDOW system (a trademark of MIT) on AIX (a trademark of IBM); a character-based environment, such as PC-DOS (a trademark of IBM) or MS-DOS (a trademark of Microsoft); a real time OS, such as OS/Open (a trademark of IBM) or VxWorks (a trademark of Wind River Systems, Inc.); or an OS, such as JavaOS, that is incorporated into a network computer. In other words, the operating system used for the PPP server 111, the file server 170, or the user's information terminal 130 is not limited to a specific operating system environment.

Figure 3:
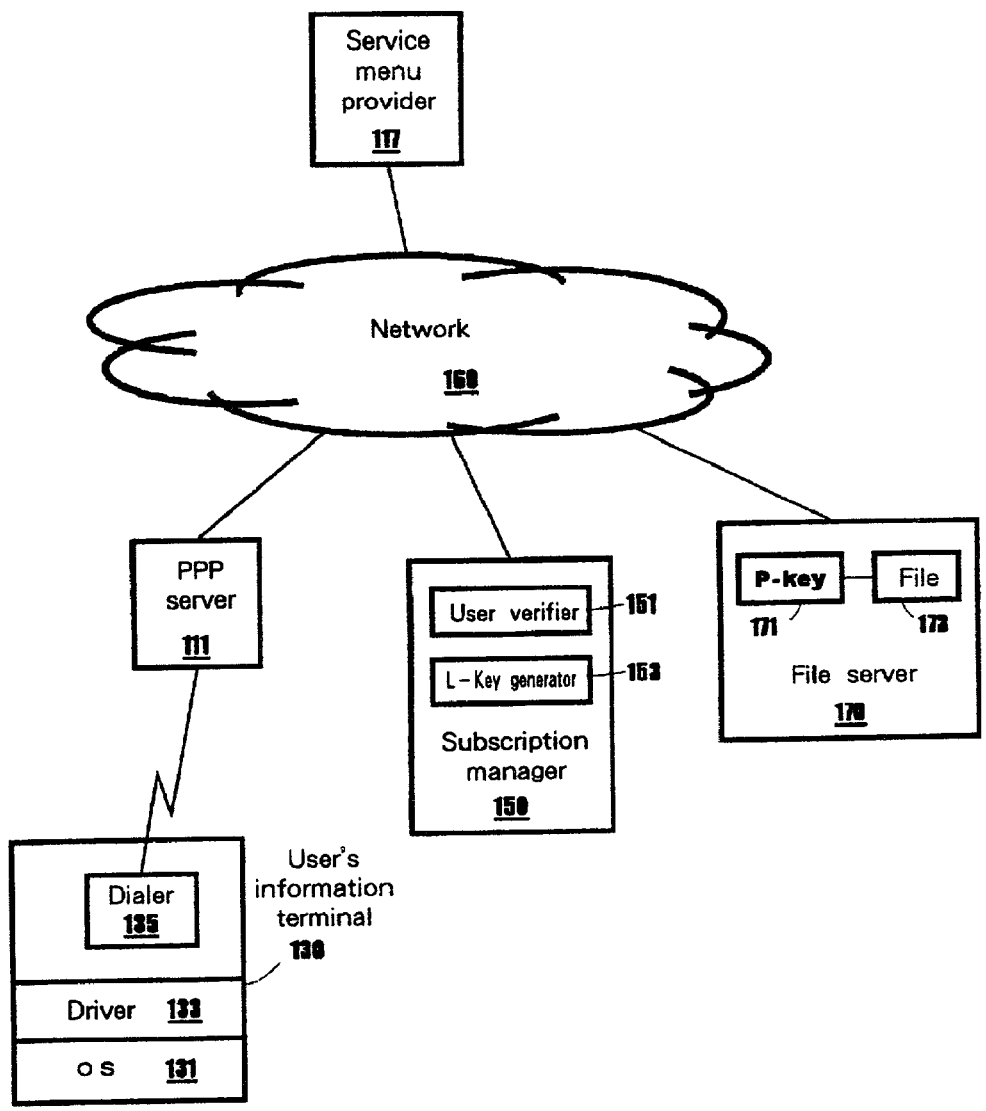
FIG. 3 is a conceptual diagram showing a network system in accordance with the first embodiment of the present invention.

FIG. 3 is a conceptual diagram showing a network system according to the embodiments of the present invention. As is shown in FIG. 3, the network system comprises the user's information terminal 130, the PPP server 111, a service menu provider 117, a subscription manager 150, a network 160 and the file server 170. The user's information terminal 130 includes an operating system 131, a driver 133 and a dialer 135. The dialer 135 is software that provides a user interface for the input of telephone numbers, user IDs and passwords that are required when the user's information terminal 130 is connected, via the PPP server 111, to the network 160. The driver 133 controls a modem.

The service menu provider 117 furnishes a menu of the services provided by the network provider 110. The subscription manager 150 verifies a user and generates an L-Key, which will be described later. The file server 170 supports the downloading of a file designated by the user. And the file server 170 may be either a server operated by the network provider 110, or a server operated by an entity having a tie-up with the network provider 110.

Since the functions of the PPP server 111, the service menu provider 117, the subscription manager 150 and the file server 170 can be provided by software, they may be mounted on a machine that is used in common, or may be arbitrarily combined and mounted on different machines.

Figure 4:
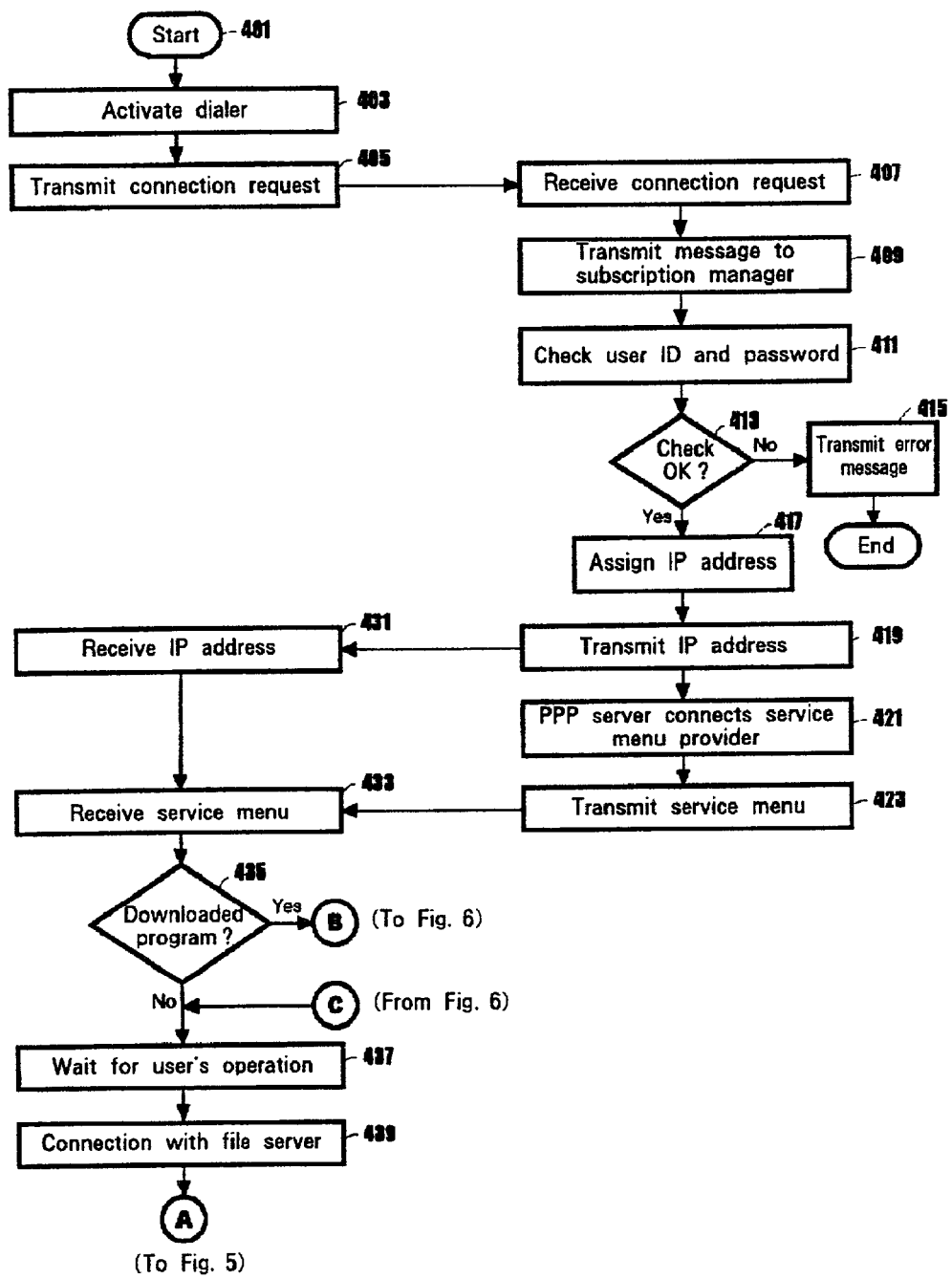
FIG. 4 is a flowchart for explaining the processing for the downloading and the use of software in accordance with the first embodiment.
Figure 5:
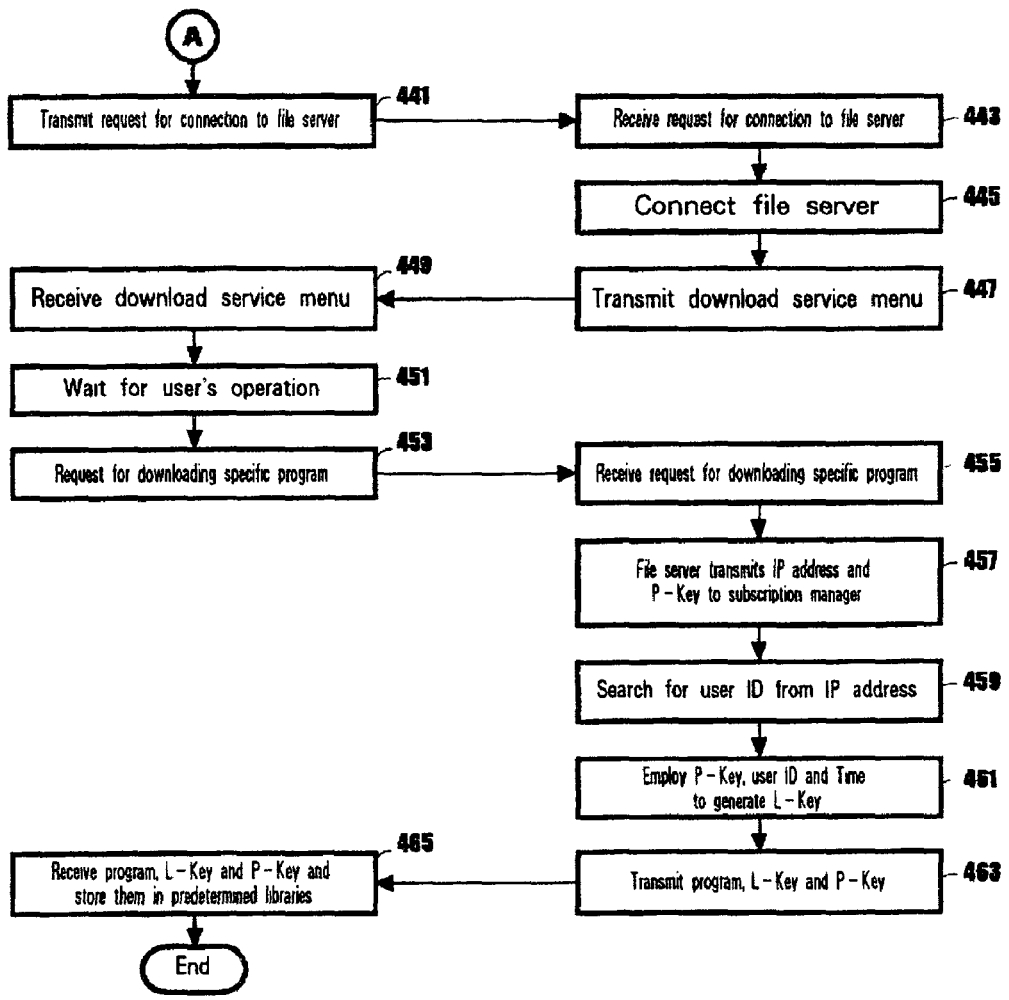
FIG. 5 is a flowchart for explaining the processing for the downloading and the use of software in accordance with the first embodiment.

FIGS. 4 and 5 are flowcharts showing the processing performed to download and to use the software according to this embodiment. This processing is initiated at step 401. At this stage, the user has already entered into a contract with the network provider 110, and has obtained a user ID and a password, and may, with the condition that a connection payment must be made, continuously access and use the network via the network provider 110. To do this, the user first activates the dialer 135 and enters the user ID, the password and a telephone number in a connection request that is transmitted to the network provider 110 (steps 403 and 405).

Figures 6, 7, 8:
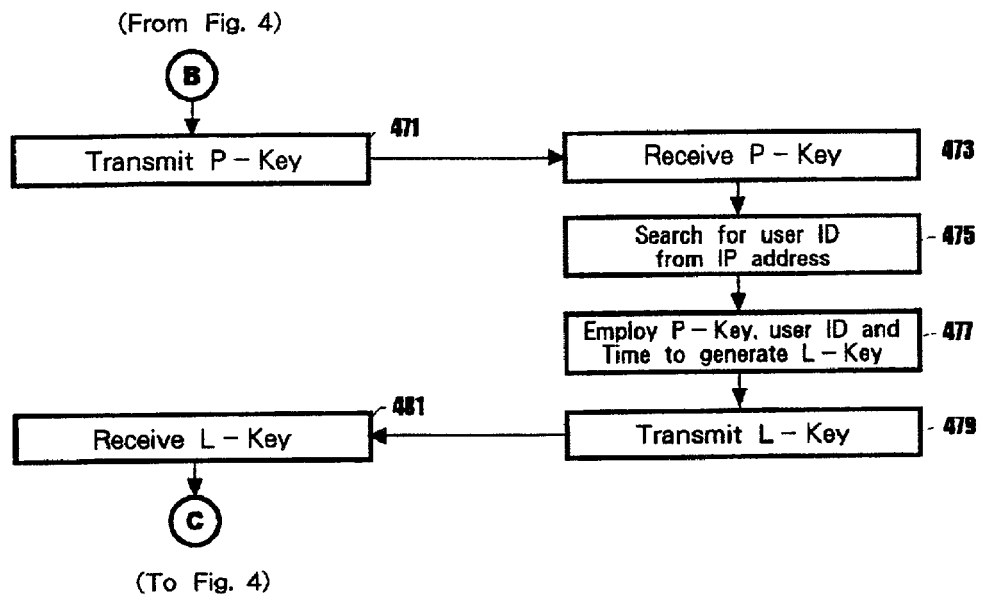
FIG. 6 is a flowchart for explaining the processing performed for the updating of an L-Key in accordance with the first embodiment.
FIG. 7 is a conceptual diagram showing a user management table in accordance with the first embodiment.
FIG. 8 is a conceptual diagram showing an IP address management table in accordance with the first embodiment.

The PPP server 111 receives this connection request (step 407), and in order to verify the user, transmits it to the subscription manager 150 (step 409), whereat the user ID and the password included in the request are checked (step 411). In this embodiment, a user management table 200, shown in FIG. 7, is included that the subscription manager 150 refers to determine whether the user ID is registered and the password is correct. In addition, the subscription manager 150 also examines a valid flag 205 to determine whether the access should be permitted. In this embodiment, the valid flag 205 interacts with a money payment system, and when a specific amount of money has not been received from a user, the valid flag 205 is updated and reflects an invalid state. With this configuration, when the payment of a fee is resumed, the same environment can be provided for the use of the network as existed before usage was prohibited due to non-payment. The valid flag 205 is not a requisite component of this invention, and instead, when a user fails to make a payment to the network provider 110 all records related to that user can be deleted.

When the results obtained by the user verification process are negative, a message is transmitted to notify the user that the connection has been disabled, and all processing is thereafter terminated (steps 415 and 416). When the user verification process is normally terminated, the subscription manager 150 assigns an IP address to the user, and registers a user ID and IP address set in an IP address management table 210 shown in FIG. 8 (step 417). The assigned IP address is then transmitted to the user together with a message indicating that a normal connection has been established (step 431).

The PPP server 111 is connected to the service menu provider 117 and transmits to the user, as an initial screen, a service menu screen (steps 421 and 423). Upon the receipt of the service menu screen, the user's information terminal 130 displays a service menu on the screen (step 433).

The dialer 135 determines whether a P-Key is present in a predetermined library (step 435). If the P-Key is present, an L-Key, which will be described later, is updated (step 436). When the P-Key is not present and the L-Key has been updated, the issuance of a request by the user is monitored (step 437). The P-Key is information for uniquely specifying the program type in the network provider, and is not necessarily encrypted.

When from the service menu the user selects the downloading of a file (step 439), the user transmits a request for the connection of the file server 170 to the PPP server 111 (step 441). The PPP server 111 receives the request for the connection to the file server 170 (step 443) and accesses the file server 170 (step 445), and in response to this request, the file server 170 transmits to the user a file download service menu via the PPP server 111 (step 447).

When the user selects from the file download service menu the downloading of a desired file (step 449), a file download request is issued to the PPP server 111 (steps 451 and 453). This request includes the IP address assigned to the user and information used to specifically identify the file selected by the user. Thereafter, the PPP server 111 receives the file download request and transmits it to the file server 170 (step 455) which subsequently transmits, to the subscription manager 150, an IP address and a P-Key 123 set that is specified by using the specific file identification information (step 457). The subscription manager 150 then refers to the IP address management table 210 and obtains the user ID that corresponds to the IP address (step 459).

Thereafter an L-Key 121 is generated by using the P-Key 123, the user ID and the current date (step 461). In this embodiment, an L-Key 121 is encrypted so that it can not be freely generated by a user. An L-Key 121 may be so designed that a program refers to it to obtain a current date and information for an available included period, or to obtain only an included current date, and the activation or execution of a program is inhibited after a specific period of time has elapsed following that date. Further, instead of the current date, information concerning an available period or information concerning the available times for activation (execution) may be included in the L-Key 121.

Once the L-Key 121 is generated it is transmitted to the user, together with the P-Key 123 and the file selected by the user (step 463). Since the processing may be interrupted by halting the downloading of a file, in this example, the P-Key 123 is transmitted to the user after the L-Key 121 has been generated. However, after the user has designated a file to be downloaded, an arbitrary timing may be used when transmitting the P-Key 123 to the user. Moreover, in this embodiment, the L-Key 121 is generated using the user ID that is determined by examining the IP address. However, when the user selects the downloading of a file, the entries may be displayed on the screen of the information terminal 130 for the input of the user ID and the password, and the user ID and the password entered by the user may again be confirmed and employed to generate the L-Key 121.

In this embodiment, a downloaded file is stored in a library that is designated by the user during the downloading process, and while the L-Key 121 is stored in a predetermined library that a program included in the downloaded file can refer to, the P-Key 123 is stored in a predetermined library that the dialer 135 can refer to (step 465). In the mode for directly downloading a program file, the registration of the L-Key 121 and the P-Key 123 is performed at the same time as the downloading, and the L-Key 121 and the P-Key 123 in this embodiment are registered using file names corresponding to the P-Key.

On the other hand, in a mode for compressing a plurality of files into one file and for downloading the compressed file, the registration of the L-Key 121 and the P-Key 123 is performed when the downloaded file is decompressed. As a result of the decompression, a plurality of programs and corresponding L-Keys 121 and P-Keys 123 can also be recovered from the one file. In this embodiment, the L-Key 121 is generated by the provider and is transmitted to the user. However, a program for generating and registering the L-Key 121 may be transmitted by the provider 110 to the user, and the user may generate the L-Key 121. In this case, the L-Key 121 may be generated based on information that is provided for specifically identifying an apparatus that executes a program.

In this embodiment, a downloaded program file, or a decompressed program file, is an application program that can be executed even after communication with the provider is terminated by the user. To activate this program, the corresponding L-Key is referred to, the contents are translated, and usage conditions (information concerning the creation date, etc.) are compared using the current date, etc. When the program does not match the usage conditions, execution of the program is halted, and information indicating that the license period has expired and information that is to be used to update the license key through a connection with the provider are displayed for the user. Since for one having ordinary skill in the art the technique is well known whereby when a license key is referred to and a condition is matched the execution of a program is halted, and when the condition is not matched the execution of the program is continued, no detailed explanation for this technique will be given in this specification.

Figures 9, 10:
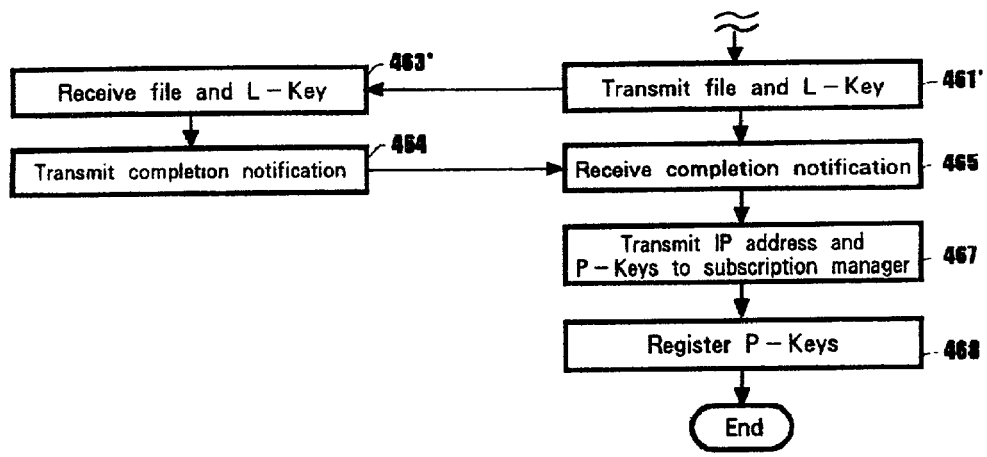
FIG. 9 is a conceptual diagram showing a program information management table in accordance with the first embodiment.
FIG. 10 is a flowchart for explaining the processing for the downloading and the use of software in accordance with the second embodiment.

FIG. 6 is a flowchart for explaining the L-Key updating processing performed in this embodiment. This processing is begun when it is ascertained at step 435 in FIG. 4 that the P-Key 123 is present in the predetermined library. First, the P-Key 123 is transmitted to the PPP server 111 (step 471), and in this embodiment, as is shown in FIG. 9, the P-Key 123 is stored, with correlated program information 233, in the program information management table 230. The program information 233 includes program names, version information and the date for the updating of the L-Key 121.

In this embodiment, the P-Key 123 is automatically transmitted to the PPP server 111. However, before this transmission is accomplished, a plurality of program information sets, respectively correlated with multiple P-Keys 123 that are currently registered, may be provided for the user; messages may be displayed to select "(1) update the license key for this program," "(2) do not update the license key for this program," and "(3) do not install this program"; and the P-Key 123 may be transmitted only when (1) is selected. When (3) is selected, the specified program and various associated files are deleted, as are the corresponding L-Key 121 and P-Key 123.

Upon the receipt of the L-Key update request at step 471 in FIG. 6, the PPP server 111 transmits this request to the subscription manager 150 (step 473). Thereafter, the subscription manager 150 specifies a user ID using the IP address included in the request (step 475), and generates a new L-Key 121 based on the P-Key included in the request and the current date (step 477). The generated new L-Key is transmitted to the user (step 479). Following this, the dialer 135 of the user's information terminal 130 receives the new L-Key 122, and overwrites the old L-Key 121 (step 481), while as is shown in FIG. 4, the process at step 437 is begun after the license updating process has been terminated. The processing in FIG. 6 can also be performed in parallel, however, by performing different processing at step 437.

One embodiment in which the P-Key is managed by the user's information terminal 130 has been explained above. In another embodiment, however, the P-Key is not managed by the user's information terminal 130, but instead is managed by the subscription manager 150. In accordance with this embodiment, at step 461 in FIG. 5 the L-Key and the file are transmitted to the user, but transmission of the P-Key need not be performed. Thus, the processing in FIG. 10 is performed after the process at step 461 in FIG. 5. In the fist embodiment, since the dialer 135 must have a special function, the network provider 110 has to download the dialer software via the network to the user's information terminal 130, or has to transmit the dialer software to the user by mail, etc., in order to install the software at the user's site. In the second embodiment, since the dialer 135 need not have a special function, the second embodiment is more useful for general purpose employment than is the first embodiment.

The file server 170 transmits a file and the L-Key 121 to the user (step 461'), and upon their receipt, the user's information terminal 130 registers the program and the L-Key 121 in the same manner as in the first embodiment (step 463'). The file server 170 then confirms that the file has been normally downloaded (steps 464 and 465), and transmits the IP address and the P-Key to the subscription manager 150 (step 467). Thereafter, the subscription manager 150 registers a P-Key 207 and 209 set, which corresponds to the user ID 201 in the user management table 200 in FIG. 12, and then refers to the IP address management table 210 and registers the P-Key in the record for the user that corresponds to the received IP address (step 468). Although in FIG. 12 the valid flag 205 is included in the user management table 200, if payment to the network provider 10 of the user's connection charge is delinquent, all records relating to the user can be deleted.

Figures 11, 12:
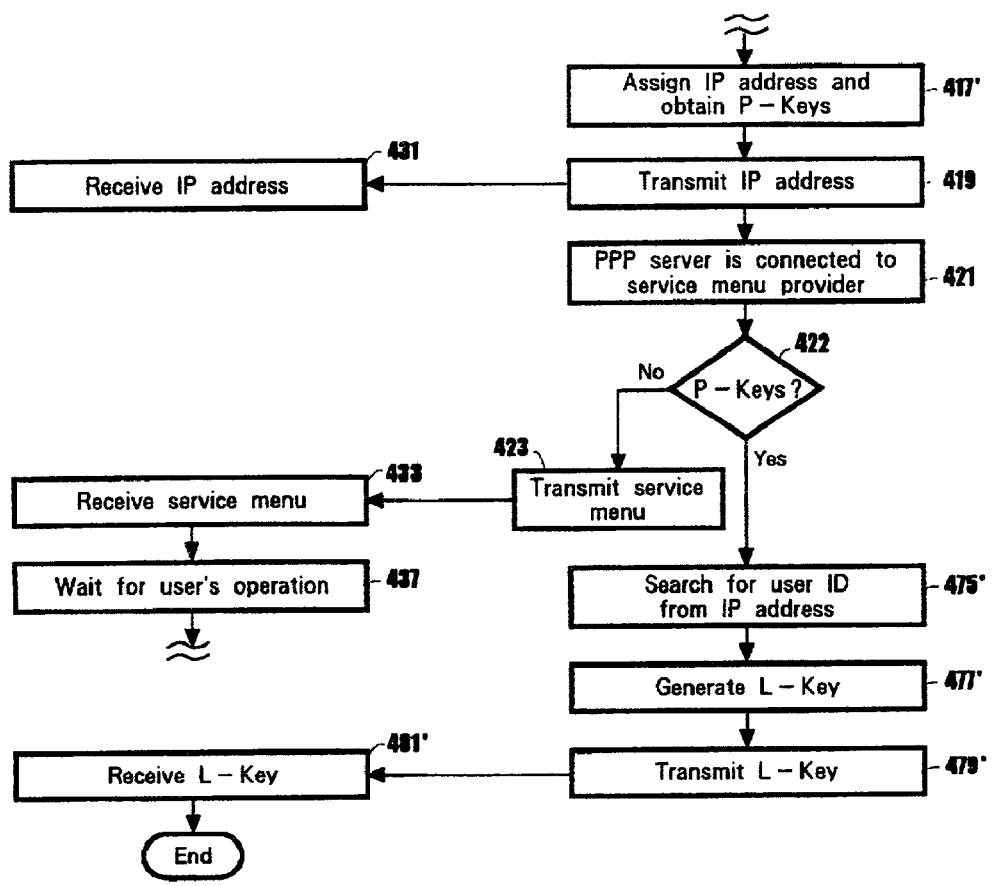
FIG. 11 is a flowchart for explaining the processing performed to update an L-Key in accordance with a second embodiment.
FIG. 12 is a conceptual diagram showing a user management table in accordance with the second embodiment.

To update the license key, the processing following step 417 in FIG. 4 is replaced by the processing in FIG. 11. As is shown in FIG. 11, when the subscription manager 150 confirms a user has been registered, an IP address is assigned to the user and is registered in the IP address management table 210, and a P-Key 207 and 209 set is obtained from the user management table 200 (step 417'). Thereafter, the obtained P-Keys and the IP address are transmitted to the service menu provider 117 (step 419).

When the PPP server 111 is connected to the service menu provider 117 (step 421), a check is performed to determine whether the P-Keys have been registered at the user site (step 422). When these P-Keys have not been registered, the service menu is transmitted to the user, as in the first embodiment, and the performance of an operation by the user awaited (steps 423, 433 and 437).

When the P-Keys have been registered, the user ID, the P-Keys and the current date are used to generate L-Keys corresponding to the P-Keys (steps 475' and 477'). In this embodiment, before the generation of the L-Keys, the P-Keys are used to perform a search of the program information management table 230 in FIG. 9, and the user is queried to determine whether he or she desires to update the license key, and whether he or she will use the program in the future. (In the second embodiment of the present invention, program information that corresponded substantially to all the files managed by the file server 170 that could be downloaded was registered.) In this case, when the user indicates that he or she will not use the program in the future, the P-Keys corresponding to the program are deleted from the user management table 200, and the L-Keys that have generated are transmitted to the user and registered in a predetermined library (steps 479' and 481').

All those certain preferred embodiments of this present invention have been described in detail with reference to the accompanying drawings, those skilled in the art should appreciate that the various changes and modifications may be made therein without departing from the spirit and scope of this invention.

What is claimed is:

1. An information distribution method for transmitting information to an information terminal connected via a network, comprising the steps of:

a user, who obtains a user ID and a password and employs a network via a network provider under a condition of payment of a connection fee, activating a dialer at said information terminal, entering said user ID, said password and a telephone number for accessing said network provider, and transmitting a connection request to said network provider;

checking, upon the receipt of said connection request for said network provider, said user ID and said password that are included in said connection request;

transmitting, when the results obtained by the check are negative, a message used to notify said user of a connection failure;

assigning, when the results obtained by the check are affirmative, an IP address to said information terminal of said user, and registering a set consisting of said user ID and said correlated IP address;

transmitting said IP address assigned for said information terminal of said user;

transmitting a service menu screen, which is an initial screen, from said network provider to said information terminal of said user;

said dialer determining whether a program key, uniquely identifying a program type at said network provider, is present at said information terminal, and where said program key is not found to be present transmitting, when said user selects a file for downloading an article on said service menu, a request for a connection with a file server from said information terminal of said user to said network provider;

transmitting, when said file server receives said connection request, to said information terminal of said user a file downloading service menu or a menu that is introduced into said service menu;

transmitting, when said user selects the downloading of a desired program file from said file downloading service menu, a file downloading request from said information terminal of said user to said network provider;

generating a license key, based on downloaded program specifying information, that is associated with said desired program file that is selected by said user and with said user ID that is specified for said IP address included in said file downloading request and assigned to said information terminal of said user, and information that is associated with a license condition for a downloaded program;

downloading to said information terminal said license key, said program key, and said desired program file, said program file referring to said downloaded license key when said downloaded program is activated or executed, and disabling at least a part of the function of said downloaded program, when said program matches a predetermined said licensing condition provided by reference to said license key;

disconnecting said information terminal of said user from said network provider;

updating said information for generating a license key by effecting a connection with said network provider, wherein said updating comprises:

activating a dialer, at a time subsequent to the termination of said immediately preceding step, in said information terminal of said user, entering said user ID, said password and said telephone number for accessing said network provider, and thereafter transmitting a connection request to said network provider;

checking again, when said network provider receives said connection request, said user ID and said password that are included in said connection request;

transmitting, when the results obtained by the check are negative, a message used to notify said user of a connection failure;

assigning an IP address, when the results obtained by the re-checking are affirmative, for said information terminal of said user and registering a set consisting of said user ID and said corresponding IP address;

transmitting said downloaded program specifying information from said information terminal of said user to said network provider;

based on said user ID and said received downloaded program specifying information generating information from which a new license key is generated;

transmitting to said information terminal of said user said information from which a new license key is generated, wherein said transmitting of said information for generating said new license key is conditioned upon said user establishing maintenance of said condition of payment of said connection fee via said connection; and generating a new license key at said information terminal of the user.

2. An information distribution method for transmitting information to an information terminal connected via a network, comprising the steps of:

a user, who obtains a user ID and a password and employs a network via a network provider under a condition of payment of a connection fee, activating a dialer at said information terminal, entering said user ID, said password and a telephone number for accessing said network provider, and transmitting a connection request to said network provider;

checking, upon the receipt of said connection request for said network provider, said user ID and said password that are included in said connection request;

transmitting, when the results obtained by the check are negative, a message used to notify said user of a connection failure;

assigning, when the results obtained by the check are affirmative, an IP address to said information terminal of said user, and registering a set consisting of said user ID and said correlated IP address;

transmitting said IP address assigned for said information terminal of said user;

transmitting a service menu screen, which is an initial screen, from said network provider to said information terminal of said user;

said dialer determining whether a program key, uniquely identifying a program type at said network provider, is present at said information terminal, and where said program key is not found to be present transmitting, when said user selects a file for downloading an article on said service menu, a request for a connection with a file server from said information terminal of said user to said network provider;

transmitting, when said file server receives said connection request, to said information terminal of said user a file downloading service menu or a menu that is introduced into said service menu;

transmitting, when said user selects the downloading of a desired program file from said file downloading service menu, a file downloading request from said information terminal of said user to said network provider;

generating a license key, based on downloaded program specifying information, that is associated with said desired program file that is selected by said user and with said user ID that is specified for said IP address included in said file downloading request and assigned to said information terminal of said user, and information that is associated with a license condition for a downloaded program;

registering said user ID and said downloaded program specifying information with which said user ID is correlated;

downloading to said information terminal said license key, said program key, and said desired program file, said program file referring to said downloaded license key when said downloaded program is activated or executed, and disabling at least a part of the function of said downloaded program, when said program matches a predetermined said licensing condition provided by reference to said license key;

disconnecting said information terminal of said user from said network provider;

updating said information for generating a license key by effecting a connection with said network provider, wherein said updating comprises:

activating a dialer, at a time subsequent to the termination of said immediately preceding step, in said information terminal of said user, entering said user ID, said password and said telephone number for accessing said network provider, and thereafter transmitting a connection request to said network provider;

checking again, when said network provider receives said connection request, said user ID and said password that are included in said connection request;

transmitting, when the results obtained by the re-checking are negative, a message used to notify said user of a connection failure;

assigning an IP address, when the results obtained by the re-checking are affirmative, for said information terminal of said user and registering a set consisting of said user ID and said corresponding IP address;

searching for said downloaded program specifying information that is registered while correlated with said user ID;

based on said user ID and said downloaded program specifying information that is found through said search generating information from which a new license key is generated;

transmitting to said information terminal of said user said information from which a new license key is generated, wherein said transmitting of said information for generating said new license key is conditioned upon said user establishing maintenance of said condition of payment of said connection fee via said connection; and generating a new license key at said information terminal of the user.

3. The information distribution method of claim 1, wherein the information used to generate the new license key comprises a user id and P-key.

4. The information distribution method of claim 3, wherein the user id is supplied by a user.

5. The information distribution method of claim 3, wherein the user id is a user id associated with an internet protocol address of the information terminal.

6. The information distribution method of claim 3, wherein the information used to generate the new license key further comprises a current date.

7. The information distribution method of claim 4, wherein the information used to generate the new license key further comprises a user password.

8. The information distribution method of claim 7, wherein the new license key is encrypted.

9. The information distribution method of claim 7, wherein the license key is used by the downloaded program to determine the current date.

10. The information distribution method of claim 2, wherein the information used to generate the new license key comprises a user id and P-key.

11. The information distribution method of claim 10, wherein the user id is supplied by a user.

12. The information distribution method of claim 10, wherein the user id is a user id associated with an internet protocol address of the information terminal.

13. The information distribution method of claim 10, wherein the information used to generate the new license key further comprises a current date.

14. The information distribution method of claim 11, wherein the information used to generate the new license key further comprises a user password.

15. The information distribution method of claim 14, wherein the license key is used by the downloaded program to determine the current date.

* * * * *